United States Patent
Sundaramurthy et al.

(10) Patent No.: US 12,460,757 B2
(45) Date of Patent: Nov. 4, 2025

(54) QUICK CONNECTOR COUPLING WITH VERIFICATION TAB

(71) Applicant: Hutchinson Fluid Management Systems, Inc., Auburn Hills, MI (US)

(72) Inventors: Nithish Kumar Sundaramurthy, South Lyon, MI (US); Daniel Blondell, St. Clair Shores, MI (US); Luc Milanini, Beverly Hills, MI (US)

(73) Assignee: Hutchinson Fluid Management Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/440,474

(22) Filed: Feb. 13, 2024

(65) Prior Publication Data
US 2025/0257829 A1   Aug. 14, 2025

(51) Int. Cl.
*F16L 37/08* (2006.01)

(52) U.S. Cl.
CPC .......... *F16L 37/08* (2013.01); *F16L 2201/10* (2013.01)

(58) Field of Classification Search
CPC . F16L 37/0841; F16L 37/088; F16L 37/0885; F16L 37/12; F16L 37/1225; F16L 37/14; F16L 37/142; F16L 37/144; F16L 2201/10
See application file for complete search history.

(56) References Cited

U.S. PATENT DOCUMENTS

| | | |
|---|---|---|
| 6,851,721 B2 | 2/2005 | Poder |
| 7,600,790 B2 | 10/2009 | Persohn |
| 8,608,507 B2 | 12/2013 | Van Swearingen |
| 10,107,433 B2 | 10/2018 | Eckard et al. |
| 10,422,459 B2 | 9/2019 | Jones et al. |
| 10,443,773 B2 | 10/2019 | Kondziella |
| 10,539,261 B2 | 1/2020 | Krug, Jr. et al. |
| 10,738,926 B2 | 8/2020 | Stieler |
| 11,131,411 B2 | 9/2021 | Gaurat et al. |
| 11,365,840 B2 | 6/2022 | Gauthier |
| 11,384,880 B2 | 7/2022 | Hunt |
| 11,460,135 B2 | 10/2022 | Wehrmann |

(Continued)

FOREIGN PATENT DOCUMENTS

| | | |
|---|---|---|
| EP | 3913272 | 11/2021 |
| EP | 4180093 | 5/2023 |
| WO | WO 2023161849 | 8/2023 |

OTHER PUBLICATIONS

Machine Translation of EP 4180093, May 17, 2023, 10 pages.
Machine Translation of EP 3913272, Nov. 14, 2021, 9 pages.

*Primary Examiner* — Aaron M Dunwoody
(74) *Attorney, Agent, or Firm* — Gunther J. Evanina; BUTZEL LONG

(57) ABSTRACT

A female connector member adapted to quickly couple with a male connector member includes a connector body having a fluid passageway and opening for receiving the male connector member, a slot defined in a wall of the female connector member, and a verification tab received in the slot and slidingly movable within the slot along a direction perpendicular to an axial direction in which the male connector is insertable, wherein the verification tab has an edge contoured to cause lateral movement of the verification tab from a first position in which indicia on the verification tab is concealed to a second position in which the indicia is visibly exposed when engaged by a projecting feature of the male connector member.

14 Claims, 8 Drawing Sheets

(56) References Cited

U.S. PATENT DOCUMENTS

| | | |
|---|---|---|
| 11,578,828 B2 | 2/2023 | Gocha et al. |
| 11,698,156 B2 | 7/2023 | Kuhn et al. |
| 11,781,690 B2 | 10/2023 | Barthel et al. |
| 2010/0284732 A1 | 11/2010 | Nakamura |
| 2022/0275894 A1 | 9/2022 | Baldreich |
| 2023/0049507 A1 | 2/2023 | Haglin |
| 2023/0108924 A1 | 4/2023 | Lee et al. |
| 2023/0184361 A1 | 6/2023 | Schroter |
| 2023/0213126 A1 * | 7/2023 | Hartmann ........... F16L 37/1225 285/93 |
| 2023/0304617 A1 | 9/2023 | Que |
| 2023/0392735 A1 | 12/2023 | Grujo et al. |
| 2024/0019061 A1 | 1/2024 | Cao |

\* cited by examiner

QUICK CONNECTOR COUPLING WITH VERIFICATION TAB

FIELD OF THE DISCLOSURE

This disclosure generally relates to quick connector couplings providing fluid-tight connections in pipe and tubing fluid conduit systems, and more particularly to quick connector couplings having a verification tab that provides a visual indication that a fluid-tight connection has been completed.

BACKGROUND OF THE DISCLOSURE

There is a recognized need for verification that quick connector assemblies, generally including a female connector and a male connector fixed together with a retainer, are properly assembled to prevent leaks. Prior attempts to provide such verification have involved use of a verification tab that is slidably displaceable along the coupling axis and includes locking elements engageable with retaining elements of a retainer ring. Another prior attempt to provide verification of proper assembly of a quick connector assembly uses a cover that is pivotally attached to the housing to conceal verification indicia before assembly and to pivot relative to the housing to reveal the indicia once the connector members have been secured together. In order to facilitate pivoting of the cover, it must be provided with a hinge and biasing member, and the female quick connector member must be provided with a hinge opening.

It is desirable to provide verification of secure assembly of the male and female connectors using fewer and simpler components.

SUMMARY OF THE DISCLOSURE

The disclosed female quick connector member provides visible verification of a secure connection with a mating male quick connector member using a simple, reliable design with as few as a single additional component.

The female quick connector member includes a connector body that defines a fluid passageway and a female coupling end adapted to receive and form a fluid-tight connection with a male quick connection member. The female coupling end has an opening for receiving a male coupling member. A slot is defined in a wall of the female coupling end for receiving and laterally deploying a verification tab. The slot is configured to allow sliding movement of the verification tab in a lateral direction perpendicular to the axial direction (i.e., the direction in which the male coupling member is inserted into the opening) from a first position in which the verification tab is sufficiently concealed to prevent reading of indicia on the verification tab to second position in which the verification tab is visibly displayed to allow reading of indicia on the verification tab and confirm a fluid-tight connection between the connector members. The verification tab has an edge, nearest the opening of the female coupling end, that is contoured to cause lateral movement of the verification tab from the first position to the second position when it is engaged by a projecting feature of the male coupling member.

In certain embodiments, the female connector body has an axial groove adapted to receive and guide a protuberance on the male coupling member along the axial direction to prevent rotation of the male coupling member relative to the female coupling member, while the protuberance engages the contoured edge of the verification tab to cause movement of the tab from the first position to the second position.

The axial groove of the connector body can have a channel-shape adapted to receive a protuberance having a right prismatic shape.

In other embodiments, the male connector body may include a projecting feature that engages the contoured edge of the verification tab without inhibiting rotation of the respective members relative to each other. For example, the projecting feature can be a circumferential ridge or an enlarged frustoconical surface.

In certain aspects, the contoured edge of the verification tab is a straight edge that is angled relative to the axial direction, with the angle being the axial direction and the straight edge being from about 15 degrees to 60 degrees.

The verification tab of any of the embodiments or aspects may include indicia on an exposed surface of the verification tab upon fluid-tight connection between the connector members. Such indicia may comprise words, symbols, or a code (including color coding), such as a QR code/Data Matrix or bar code.

DETAILED DESCRIPTION

Figure 1:
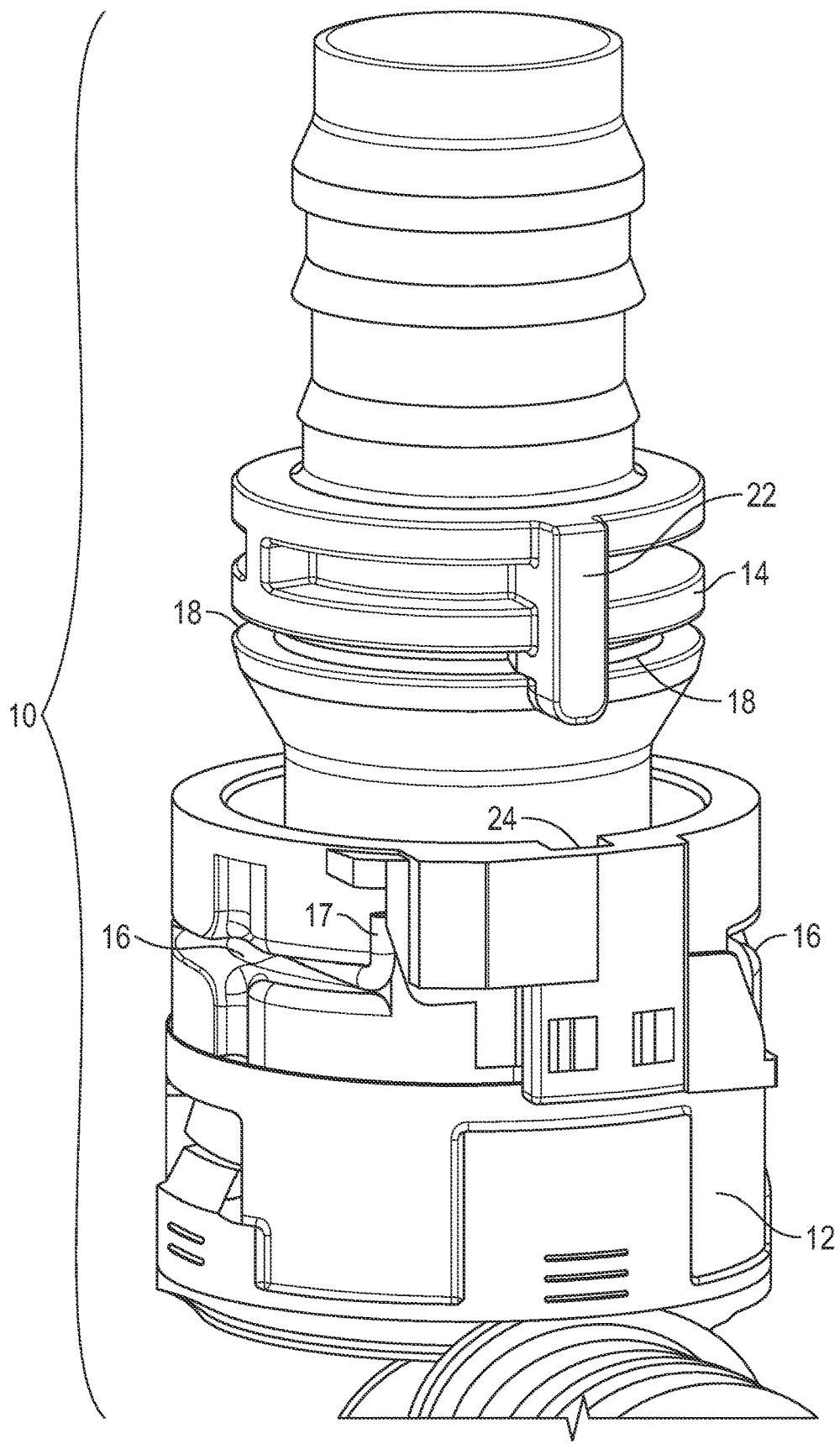
FIG. 1 is a perspective view of a quick connector assembly including a female connector member and a male connector member prior to being joined together.
Figure 3:
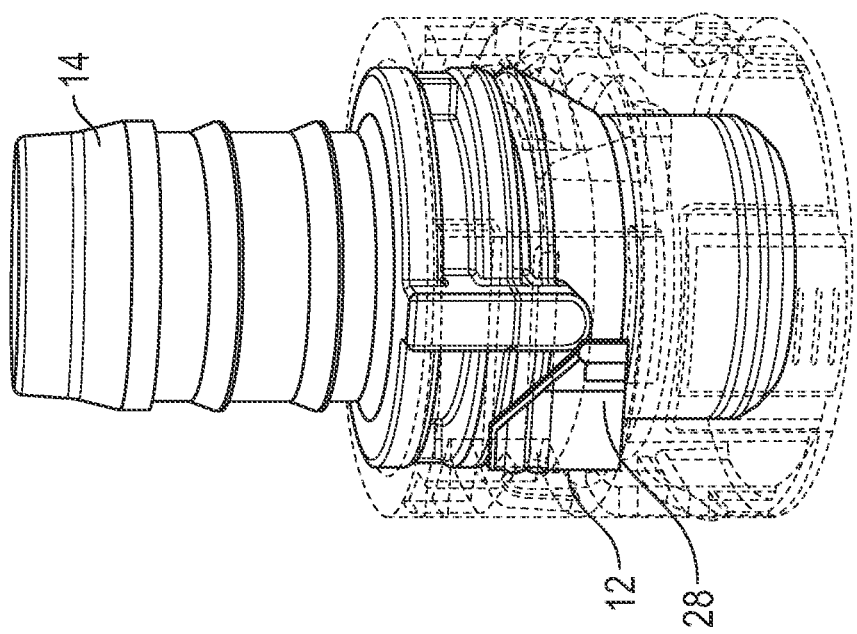
FIG. 3 is a perspective view of the assembly of FIGS. 1 and 2 with the male member fully inserted and the slidable verification tab exposed.

Shown in FIG. 1 is a quick connector assembly 10 including a female connector member 12 and a male connector member 14 prior to being joined together. Member 12 can be provided with a retainer slot 16 to allow a retainer clip 17 to engage retainer groove 18 on opposite sides of member 14 when in the assembled state. Retainer clip 17 can be plastic or metal.

Figure 2:
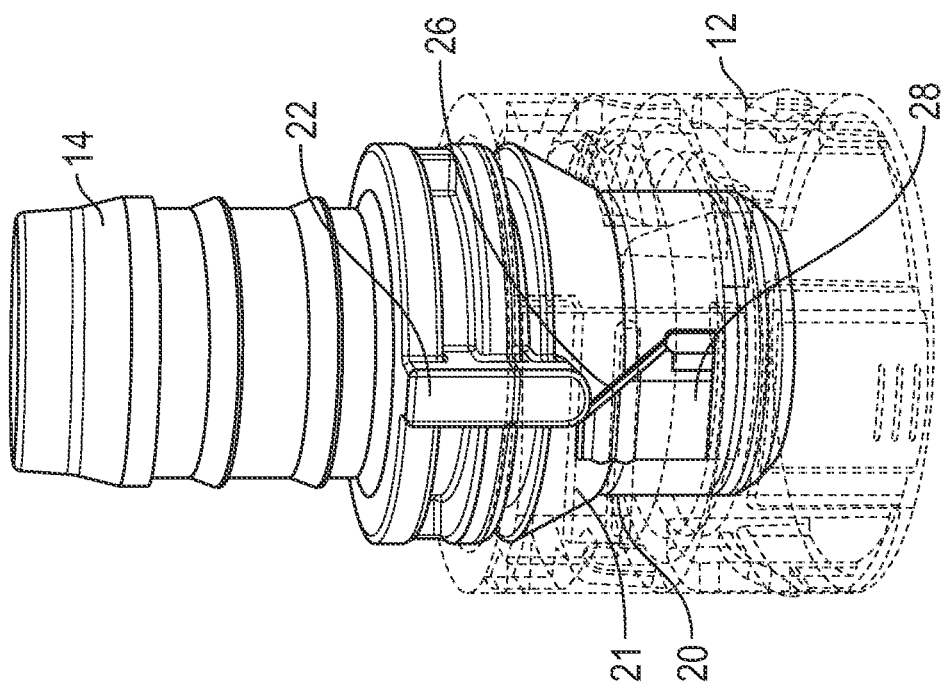
FIG. 2 is a perspective view of the assembly of FIG. 1 with the male member partially inserted into the female member to begin contact of a protuberance on the male member with a slidable verification tab.
Figure 4:
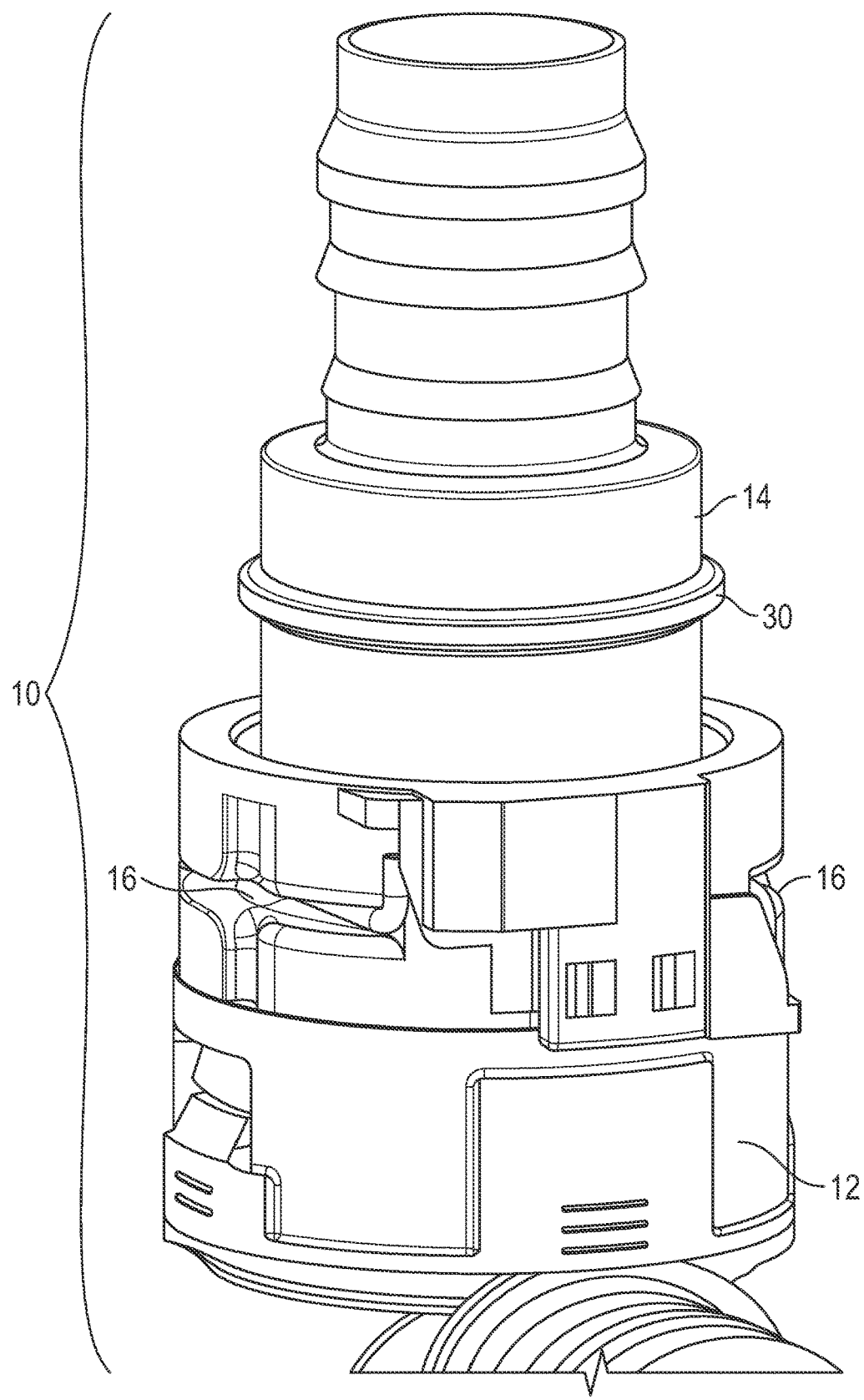
FIG. 4 is a perspective view of an alternative embodiment of a quick connector assembly including a female connector member and a male connector member prior to being joined together.
Figure 5:
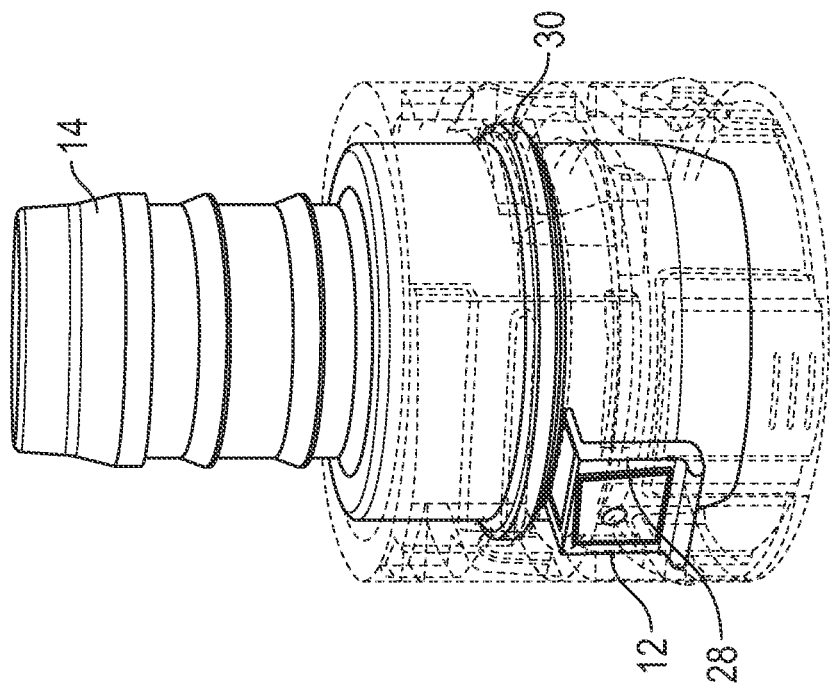
FIG. 5 is a perspective view of the assembly of FIG. 4 with the male member partially inserted into the female member to begin contact of a protuberance on the male member with a slidable verification tab.
Figure 6:
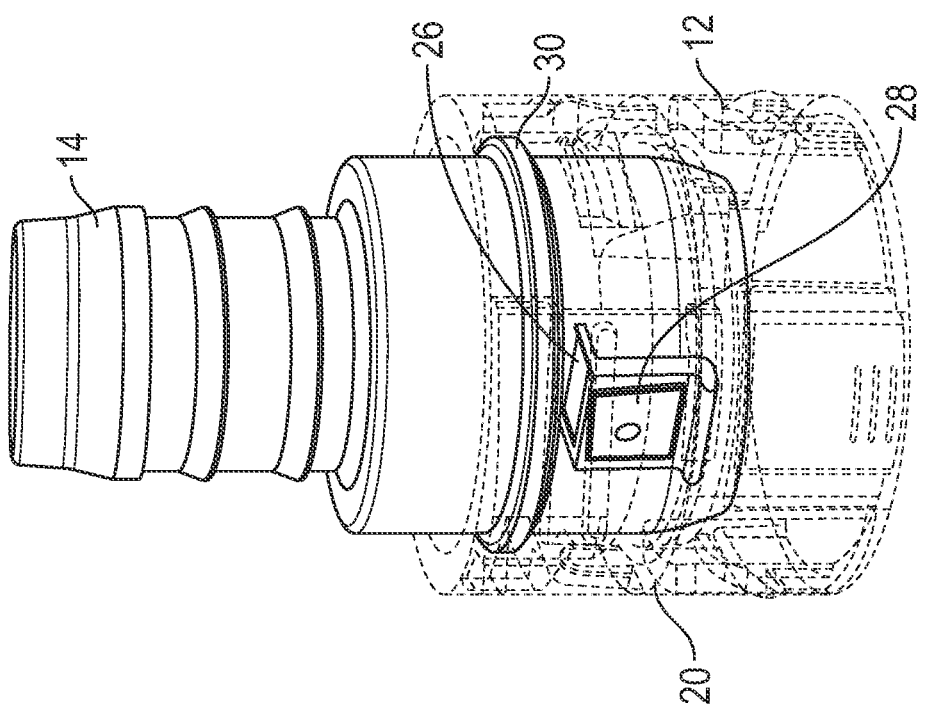
FIG. 6 is a perspective view of the assembly of FIGS. 4 and 5 with the male member fully inserted and the slidable verification tab exposed.
Figure 7:
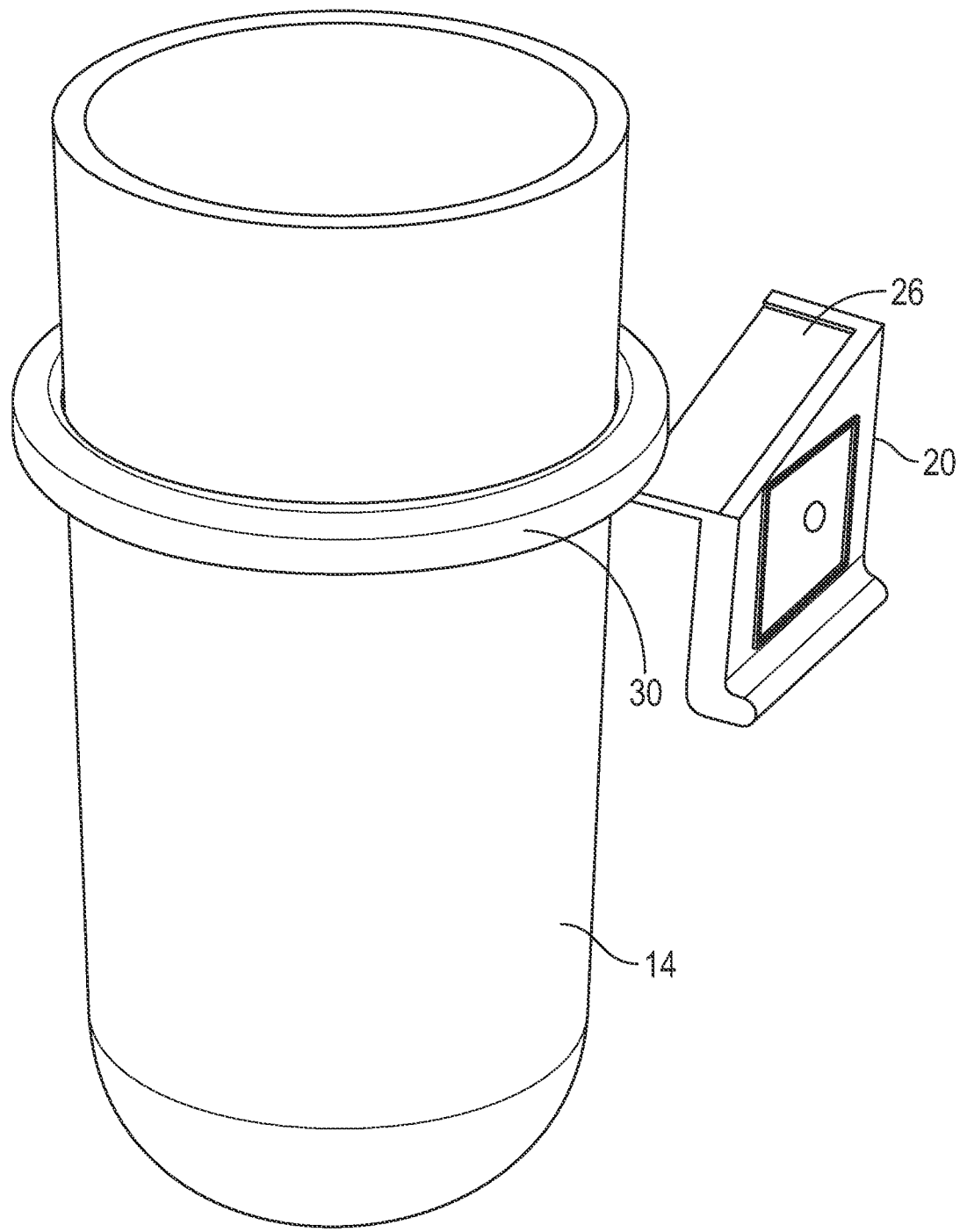
FIG. 7 is a simplified perspective view of the assembly of FIGS. 4-6, showing engagement of a circumferential ridge of the male connector member with the contoured edge of the verification tab.
Figure 8:
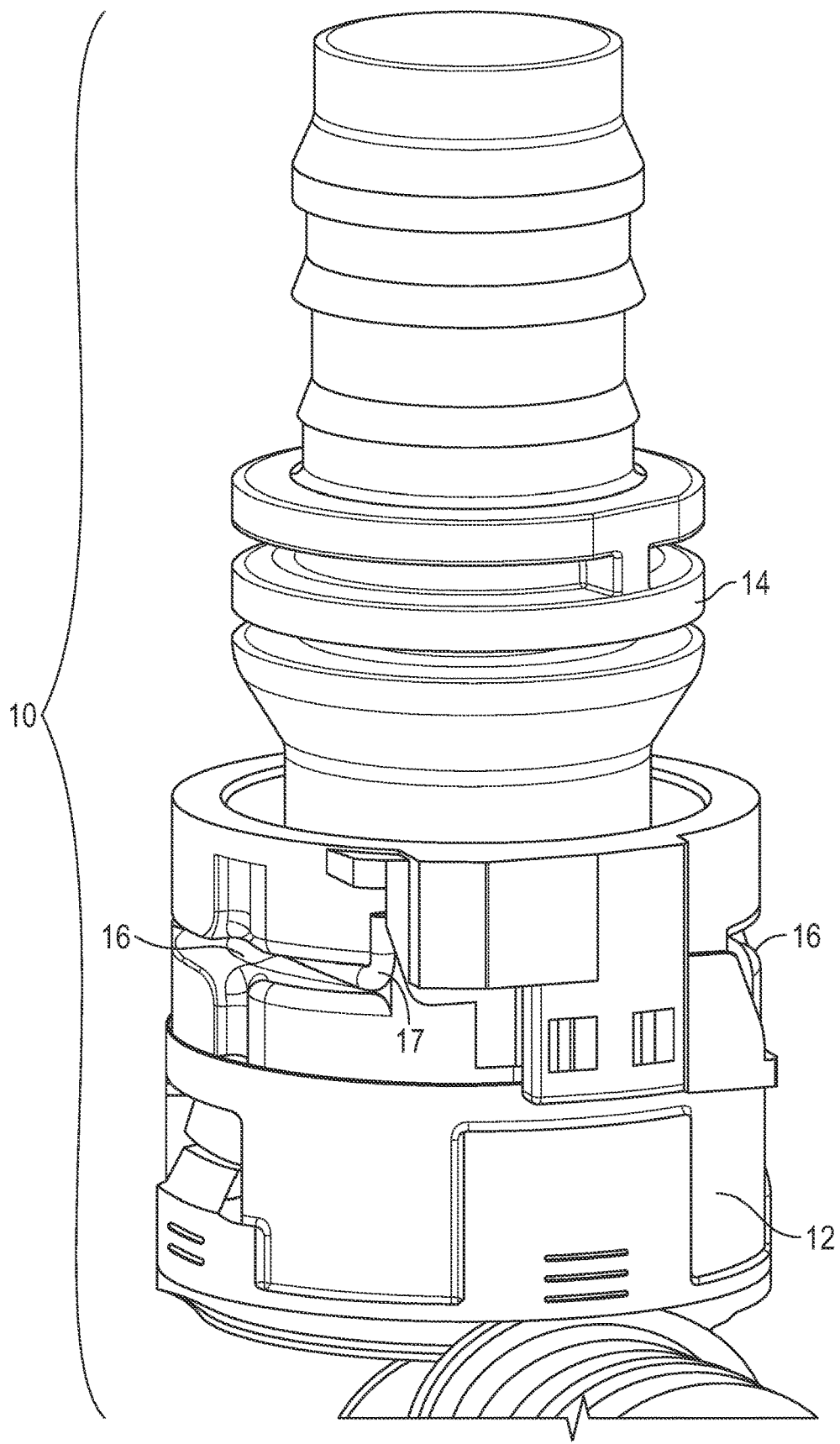
FIG. 8 is a perspective view of another alternative embodiment of a quick connector assembly including a female connector member and a male connector member prior to being joined together.
Figure 10:
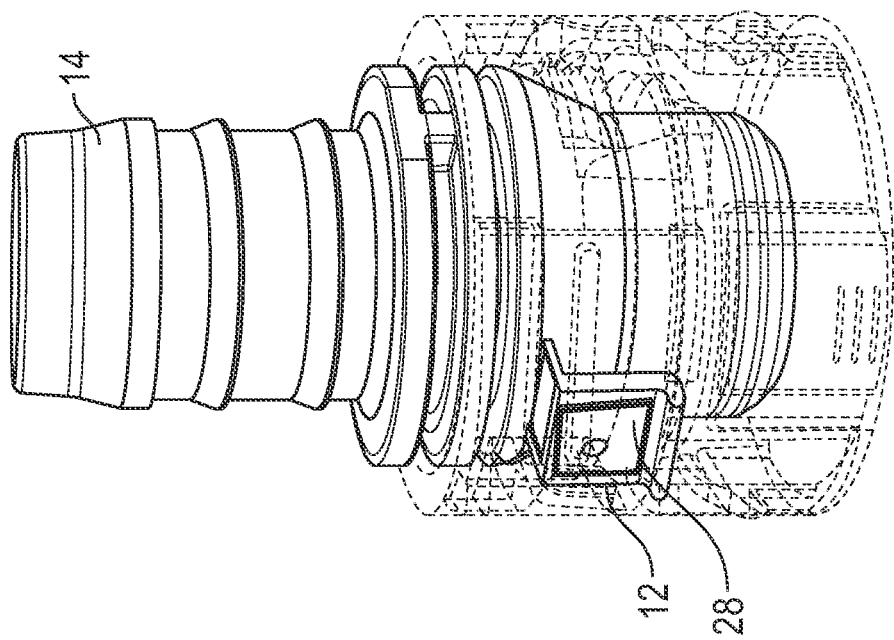
FIG. 10 is a perspective view of the assembly of FIGS. 8 and 9 with the male member fully inserted and the slidable verification tab exposed.
Figure 9:
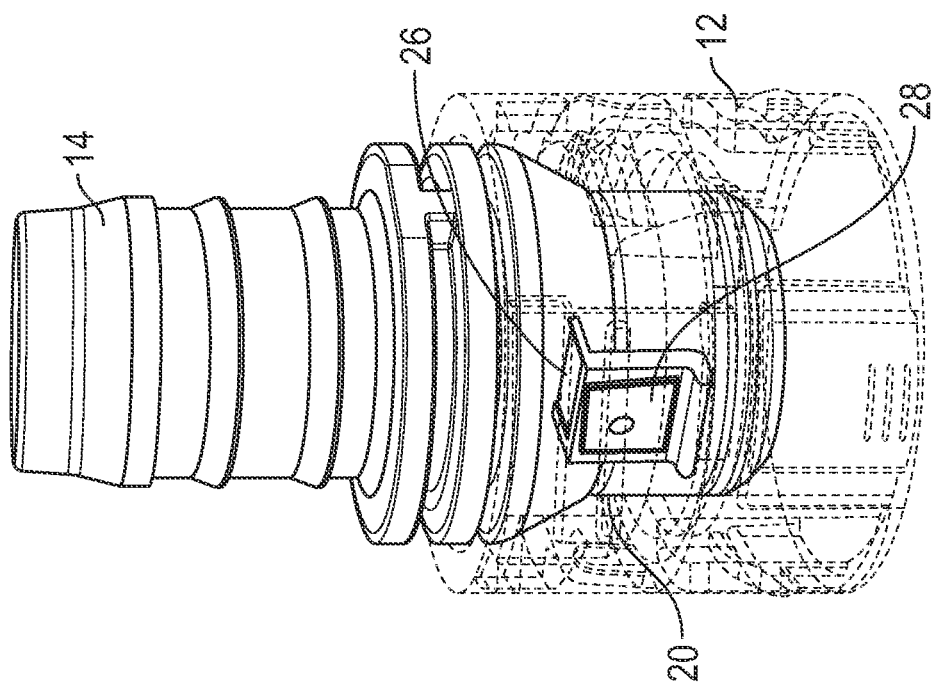
FIG. 9 is a perspective view of the assembly of FIG. 8 with the male member partially inserted into the female member to begin contact of a protuberance on the male member with a slidable verification tab.
Figure 11:
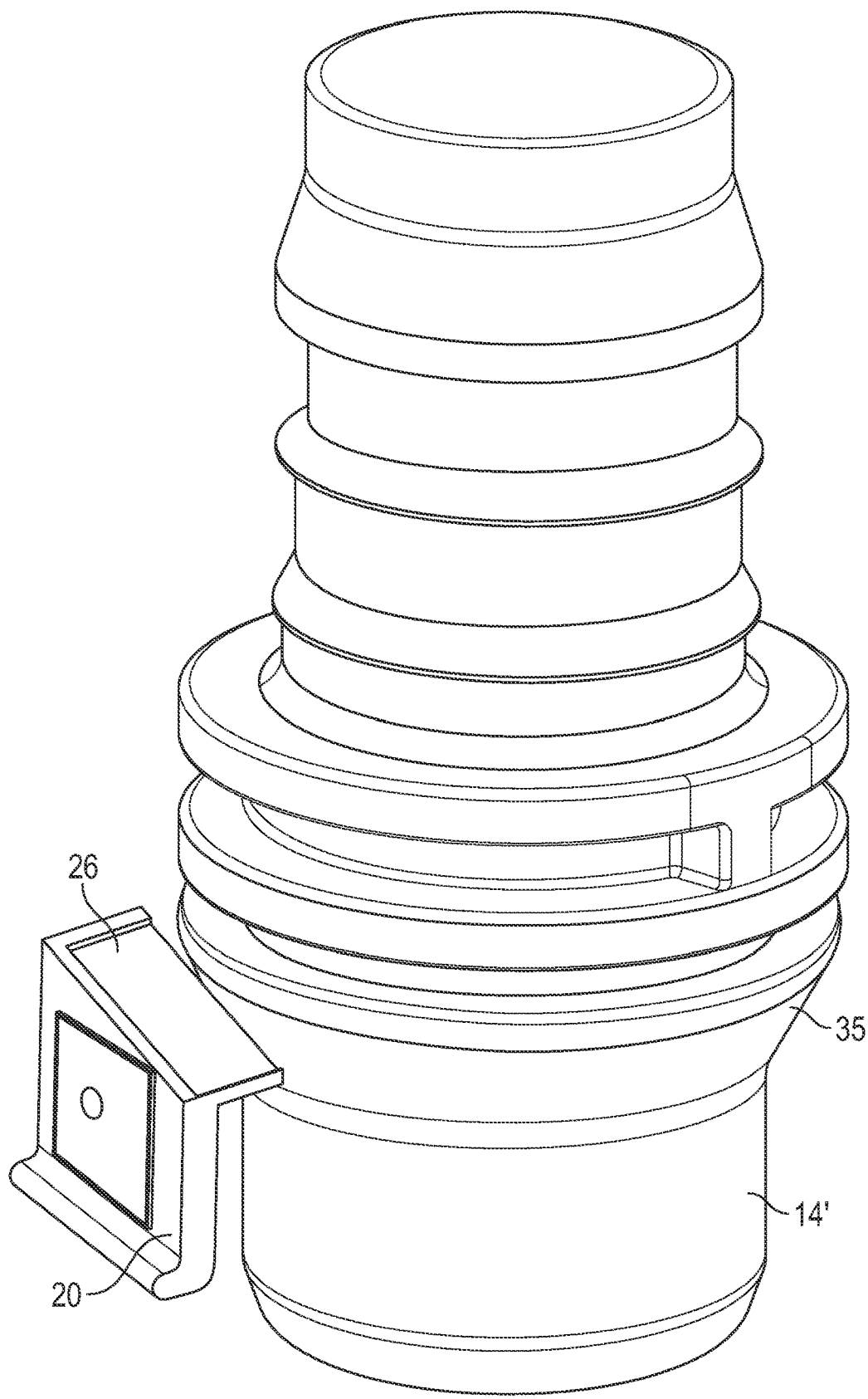
FIG. 11 is a simplified perspective view of the assembly of FIGS. 8-10, showing engagement of an enlarged frustoconical surface of the male connector member with the contoured edge of the verification tab.

FIG. 2 shows member 12 in outlined form to illustrate the location of a movable verification tab 20 along a slot 21 defined by member 12. For example, slot 21 can be defined by grooves and/or walls of member 12. A protuberance 22 can be provided on male connector member 14 for engaging and deploying verification tab 20 upon insertion of member 14 into female connector member 12. Protuberance 22 is slidable along a channel-shaped groove 24, which traps right prismatic shaped protuberance 22, preventing rotation of member 14 relative to member 12 during insertion of member 14 into member 12. Other shapes for protuberance 22 and groove 24 can be used. In other embodiments, other projecting features such as ridges or enlarged sections of the male connector member can be used, with or without channel shaped groove(s) and anti-rotation feature(s). As member 14 is pressed toward member 12, a surface of protuberance 22 engages a contoured edge 26 of verification tab 20 and forces tab 20 to slide along the slot defined by member 12 from a concealed position shown in FIG. 2 to a position in which an indicia display region 28 of tab 20 is visibly displayed to provide verification of a proper connection between the members 12 and 14. During assembly, protuberance 22 interacts with edge 26 of tab 20 to translate axial movement of member 14 relative to member 12 into lateral movement of tab 20 in a direction perpendicular to the axial movement of member 14 to allow viewing of an indicia display region 28. Upon full insertion of member 14 into member 12, the indicia display region 28 is completely exposed along with any markings or indicia provided within the indicia display region.

In an alternative embodiment, shown in FIGS. 4-7, the groove 24 of member 12, and protuberance 22 of member 14, can be omitted and instead member 14 can have a projecting feature such as a circumferential ridge 30 that engages edge 26 of verification tab 20.

In another alternative embodiment, shown in FIGS. 8-11, groove 24 and protuberance 22 can be omitted and instead member 14 can have an enlarged section 35, such as a frustoconical section capable of engaging edge 26 of tab 20.

The contoured edge 26 of verification tab 20 that is engaged by a projecting feature of male connector member 14, such as protuberance 22, ridge 30 or enlarged section 35, can be straight or curved (e.g., parabolic, hyperbolic, sinusoidal, etc.). Straight edges 26 are presently preferred, as they are believed to be most easily manufactured. Straight edge 26 is preferably oriented at an acute angle relative to the axial direction in which member 14 is inserted into member 12, with an acceptable angle being from about 15 degrees to 60 degrees or 40 degrees to 50 degrees (e.g., about 45 degrees).

The indicia display region 28 of tab 20 can be provided with indicia, such as a machine-readable code (e.g., bar code or QR code) that can be applied using various techniques, such as printing, laser etching, painting, engraving, embossing, molding, etc. The indicia can also, or alternatively, include words, letters, numbers, or symbols that can be read by a human.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

The invention claimed is:

1. A female connector member, comprising:
   a connector body defining a fluid passageway having an opening adapted to receive and connectable engage a male connector member;
   a slot defined by grooves or walls of the connector body; and
   a verification tab received in the slot and slidingly movable within the slot along the grooves or walls in a lateral direction perpendicular to an axial direction in which the male connector is insertable, the verification tab having an edge that is contoured to cause lateral movement of the verification tab from a first position in which the verification tab is concealed to a second position in which the verification tab is visibly exposed when engaged by a projecting feature of the male connector member during insertion of the male connector member into the opening, whereby effective coupling of the quick connecting coupling members can be verified;
   wherein the connector body has a groove at an inner surface of a wall of the connector body adapted to receive and guide a protuberance projecting from the male connector member to prevent rotation of the male connector member relative to the connector body during connection.

2. The quick connector member of claim 1, wherein the groove has a channel-shape to receive a protuberance having a right prismatic shape.

3. A quick connection assembly comprising the female connector member of claim 1, and a male connector member having a projecting protuberance engageable with the groove.

4. A female connector member, comprising:
   a connector body defining a fluid passageway having an opening adapted to receive and connectably engage a male connector member;
   a slot defined by grooves or walls of the connector body; and
   a verification tab received in the slot and slidingly movable within the slot along the grooves or walls in a lateral direction perpendicular to an axial direction in which the male connector is insertable, the verification tab having an edge that is contoured to cause lateral movement of the verification tab from a first position in which the verification tab is concealed to a second position in which the verification tab is visibly exposed when engaged by a projecting feature of the male connector member during insertion of the male connector member into the opening, whereby effective coupling of the quick connecting coupling members can be verified wherein the contoured edge of the verification tab is straight, and at an acute angle in relation to the axial direction.

5. The quick connector member of claim 4, wherein the connector body is adapted to allow engagement of the verification tab with a circumferential ridge on the male connector member.

6. A quick connection assembly comprising the female connector member of claim 5, and a male connector member having a circumferential ridge for engaging the verification tab.

7. A quick connection assembly comprising the female connector member of claim 6, and a male connector member having an enlarged frustoconical section for engaging the verification tab.

8. The quick connector member of claim 4, wherein the angle of the straight edge of the verification tab relative to the axial direction is from 15 degrees to 60 degrees.

9. The quick connector member of claim 4, wherein the angle of the straight edge of the verification tab relative to the axial direction is from 40 degrees to 50 degrees.

10. The quick connector member of claim 4, further comprising indicia on a surface of the verification tab that is visibly displayed when the female quick connector member is effectively coupled with the male quick connector member.

11. The quick connector member of claim 10, wherein the indicia is a machine-readable code.

12. The quick connector member of claim 11, wherein the machine-readable code is a QR code or a bar code.

13. The quick connector member of claim 10, wherein the indicia include words, numbers and or symbols that can be read by a human.

14. The quick connector member of claim 4, wherein the connector body is adapted to allow engagement of the verification tab with a frustoconical section of the male connector member.

* * * * *